Oct. 17, 1950  C. C. BRADBURY  2,526,457
MASTER CYLINDER
Filed Feb. 3, 1949
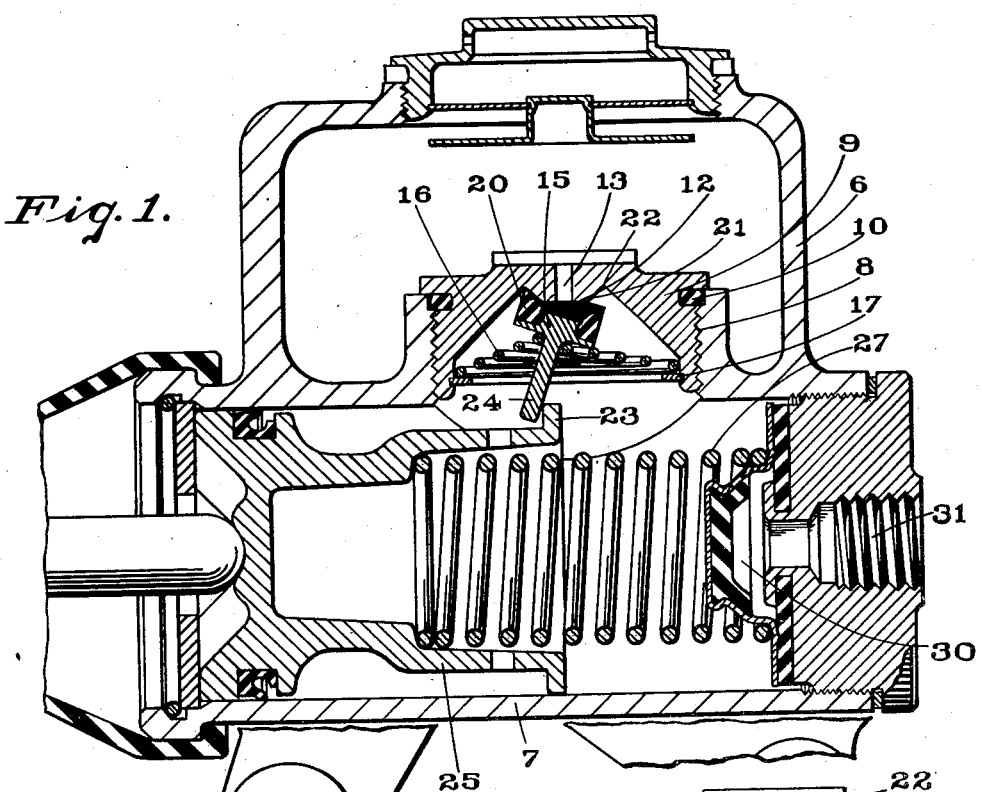
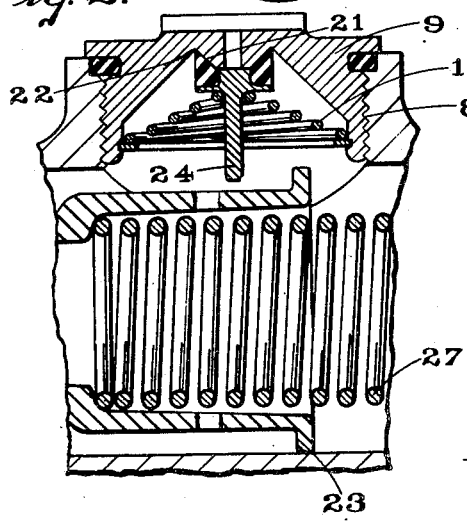
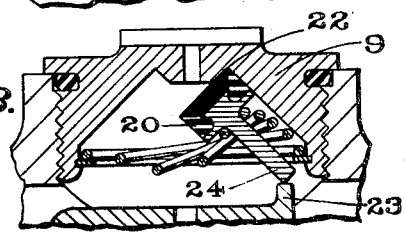
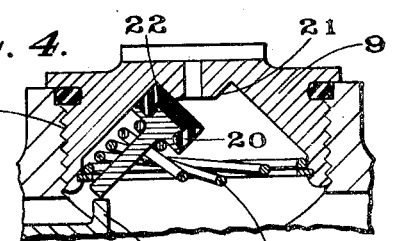
INVENTOR.
CLIFFORD C. BRADBURY
BY Guy M. Campbell
ATTORNEY Patented Oct. 17, 1950

2,526,457

UNITED STATES PATENT OFFICE 2,526,457

MASTER CYLINDER

Clifford C. Bradbury, Richmond, Ind., assignor to Hydraulic Brake Company, Detroit, Mich., a corporation of California Application February 3, 1949, Serial No. 74,387

3 Claims. (Cl. 60—54.6)

This invention relates to master cylinders, and particularly to a combined master cylinder and reservoir in which a tilting valve provides the means of communication between the reservoir and cylinder.

The object of this invention is to provide a tilting valve which is tilted off its seat by a flange on the end of the piston in the master cylinder, the valve being provided with sufficient tilting space so that the piston may be inserted in the cylinder or removed from the cylinder without first removing the valve.

My invention is illustrated in the accompanying drawing, in which

Fig. 1 is a vertical section through the master cylinder, reservoir and tilting valve, with the piston illustrated in its normal position, and the valve opened by tilting.

Fig. 2 is a fragmentary section through the cylinder and reservoir with the valve shown in its closed position.

Fig. 3 is a fragmentary section through the cylinder and reservoir, showing the valve as it would be tilted when the piston is being inserted in the cylinder, and Fig. 4 is a fragmentary section through the cylinder and reservoir showing the valve as it would be tilted when the piston is being removed from the cylinder.

The reservoir 6 is cast integrally with the cylinder 7, there being a threaded opening 8 between them in which a valve housing 9 is screwed against a sealing ring 10. The housing 9 is provided with a valve seat 12 having a passageway 13 through it for fluid communication between the reservoir and the cylinder. A metallic valve member 15 is held against the seat 12 by a spring 16 seated on a C-spring 17 snapped into a groove in the housing 9.

A rubber gasket 20 surrounds the valve member 15 and is shaped to seal upon the external conical surface 21 which surrounds the valve seat 12. The conical surface 21 terminates at its upper margin in a shoulder 22 into which the edge of the rubber gasket 20 fits to provide a pivot on which the valve may be tilted far beyond its normal opening position to permit the flange 23 to pass the end of the valve stem 24 upon the insertion or removal of the piston 25.

Within the cylinder 7, a spring 27 urges the piston 25 toward its normal position, this spring being of superior strength to that of the spring 16, so that the valve will be tilted when the piston 25 returns to its normal position under the influence of the spring 27.

A valve mechanism 30, forming no part of this invention, permits fluid to flow from the cylinder toward the outlet 31 with very slight restriction, but restricts the return flow of fluid from the outlet 31 into the cylinder sufficiently to maintain a small pressure on the piping and motors connected with the outlet 31 to insure against air leakage into the motor, cylinders and piping.

The principal advantage of this invention is realized in servicing cylinders which are in use. It sometimes becomes necessary to examine the packing on master cylinder pistons, and with the use of this invention, the master cylinder piston 25 may be removed from the cylinder 7 and replaced without removing the valve housing 9.

In the operation of this cylinder and valve, the reservoir 6 is filled with operating fluid, and bleeder openings at the motors are opened in the usual manner. The reciprocation of the piston pumps fluid from the reservoir, past the valve member 15, into the cylinder, through the valve mechanism 30, and through the outlet 31, into the piping extending to the motors. The continued reciprocation of the piston pumps the air out of the piping through open bleeder holes at the motors until solid fluid flows out of the bleeder holes.

Upon the first movement of the piston 25 on a pressure stroke, the flange 23 moves to the right, permitting the valve member 15 to straighten so that the rubber packing 20 seals the opening through the valve seat 12 by tightly engaging the outside of the cone 21. Upon the return of the piston to normal position, the valve member 15 is again tilted to permit free flow of fluid either from the cylinder to the reservoir, or from the reservoir to the cylinder, responsive to expansion or contraction of the brake fluid. If, during the pressure stroke of the piston, some of the brake fluid has escaped from the motors or piping, then, upon the partial return of the piston 25 towards its normal position, suction created in the cylinder will pull the valve member 15 off its seat to permit replacement fluid to flow from the reservoir into the cylinder.

When the piston 25 is removed from the cylinder for inspection or repair, the flange 23 tilts the valve to the left, as shown in Fig. 4, the upper part of the rubber sealing member 20 serving as a pivot about which the valve tilts. The spring 16 is sufficiently flexible that it is deformed to permit the valve to tilt to the external position shown in Fig. 4. The reverse operation takes place upon the reinsertion of the piston, and the valve member 15 under this condition assumes the position shown in Fig. 3.

Although I have shown and described my invention with respect to certain details of construction, it is to be understood that I do not wish to be unduly limited thereto, certain modifications being possible within the purview of my invention.

I claim:

1. In a combined master cylinder and reservoir, a valve for closing a fluid opening between the reservoir and the cylinder having a stem protruding into the cylinder, a piston in the cylinder having a flange for engagement with the stem of said valve to tilt the valve on its seat to open the passage between the reservoir and the cylinder, the opening through the wall of the cylinder being of such size that the stem of the valve member may be tilted in each direction along the axis of the cylinder far enough to permit the flange on said piston to move past the end of the valve stem.

2. In a combined master cylinder and reservoir, a piston having a packing movable in the cylinder, there being an opening through the wall between the cylinder and reservoir beyond the pressure stroke of the piston packing, a valve seating toward the reservoir for closing said opening and having a stem protruding into the cylinder, a flange in the cylinder movable with the piston and adapted to engage the valve stem to open the valve by tilting it on its seat, a spring for holding the valve on its seat, the opening through the wall between the cylinder and the reservoir being large enough to permit the valve stem to be tilted by said flange sufficiently to permit the flange to move past the valve stem so that the piston may be removed and replaced in the cylinder without first removing the valve.

3. In a combined master cylinder and reservoir in which there is an opening between the cylinder and the reservoir, a piston having a packing reciprocable in the cylinder at one side of the opening between the cylinder and the reservoir, a flange integral with the piston and having a normal position in the cylinder opposite the opening between the cylinder and the reservoir, a valve for closing said opening having a stem extending into the cylinder and engagable by said flange to tilt the valve on its seat to open the passageway between the cylinder and the reservoir when the piston packing is in its unactuated position, the valve stem being of such length that when the flange is moved in the withdrawal of the piston from the cylinder, the stem of the valve tilts into the opening to permit the flange to pass the valve stem whereby the piston may be withdrawn and inserted in the cylinder without the removal of the valve.

CLIFFORD C. BRADBURY.

No references cited.